May 19, 1942.  C. H. WILLIAMS  2,283,838
APPARATUS FOR CUTTING PASTRY STRIPS
Filed April 12, 1941  5 Sheets-Sheet 1
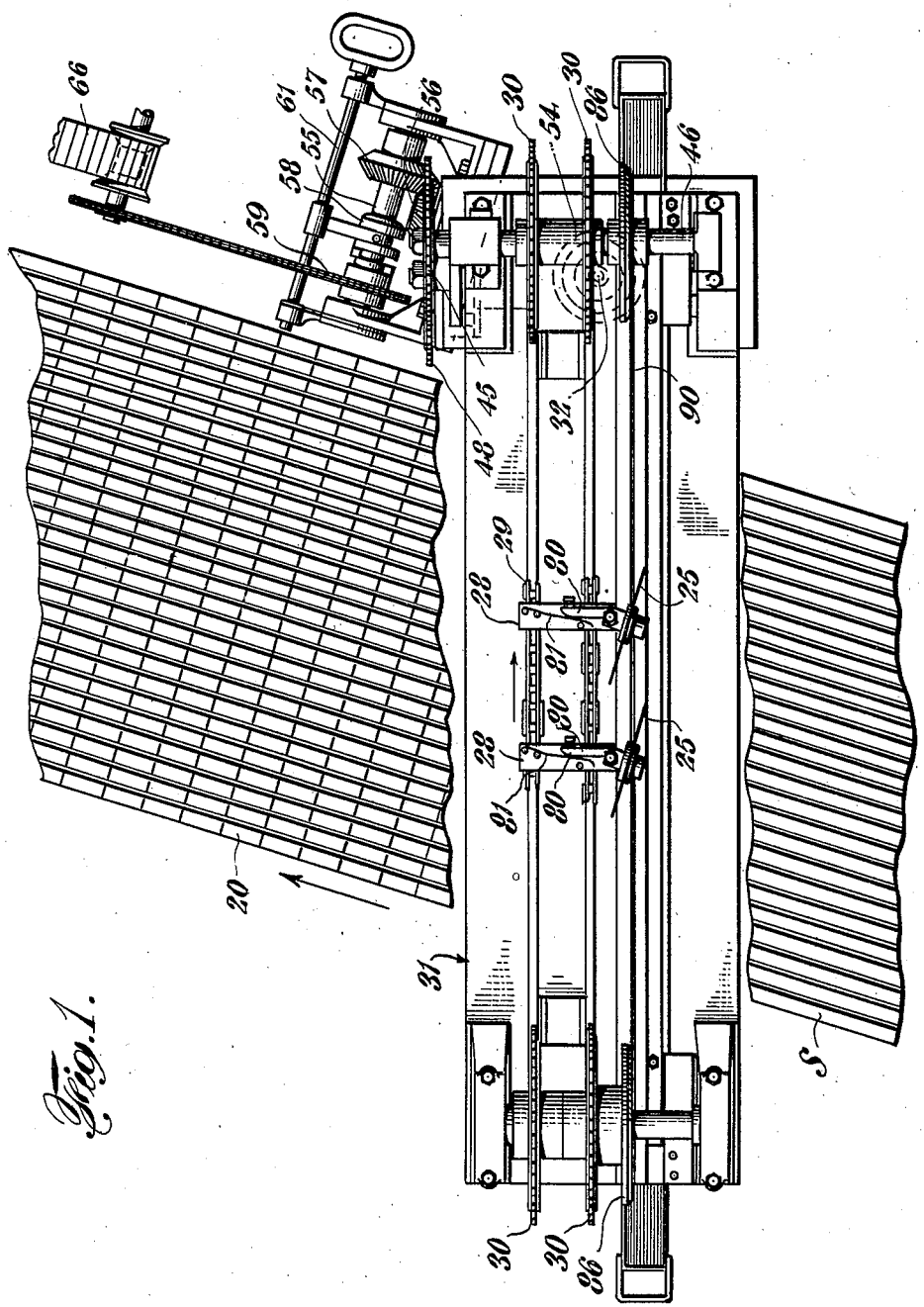
INVENTOR
Charles H. Williams
BY
ATTORNEY

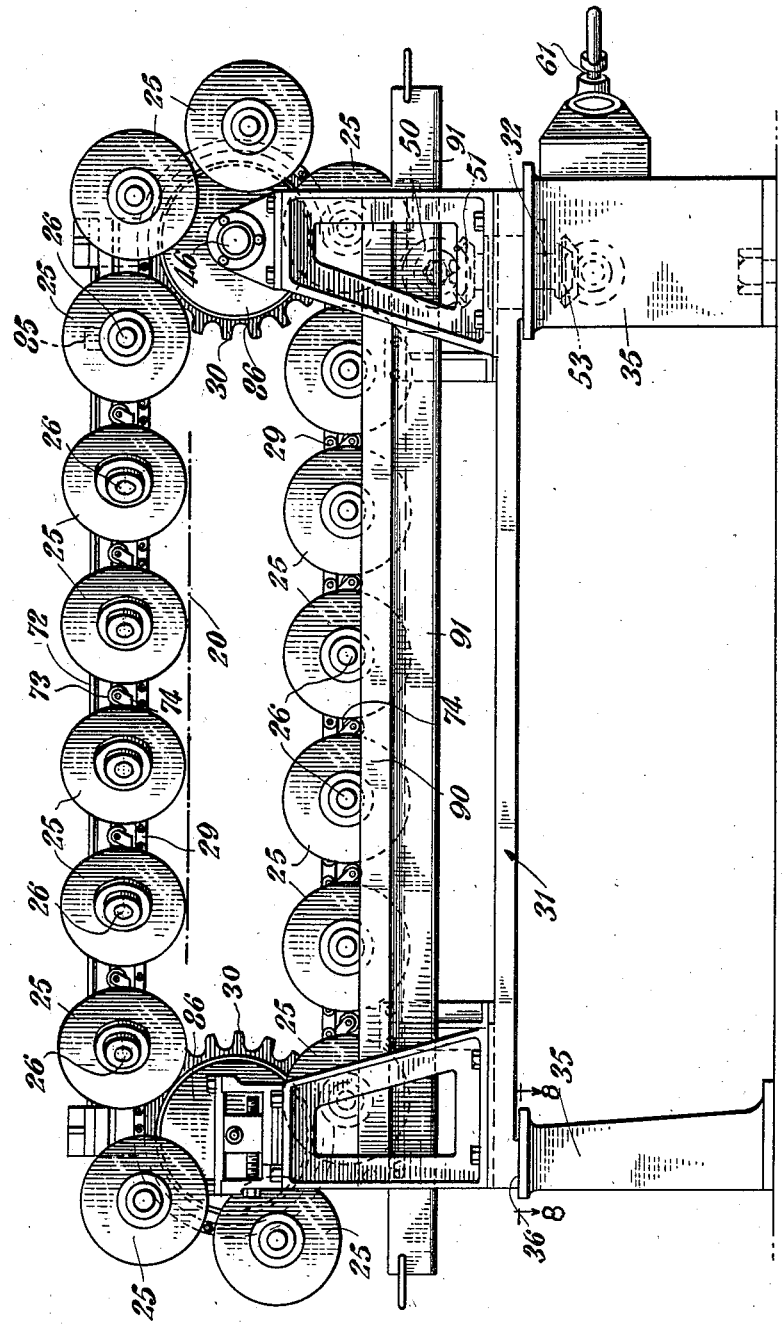

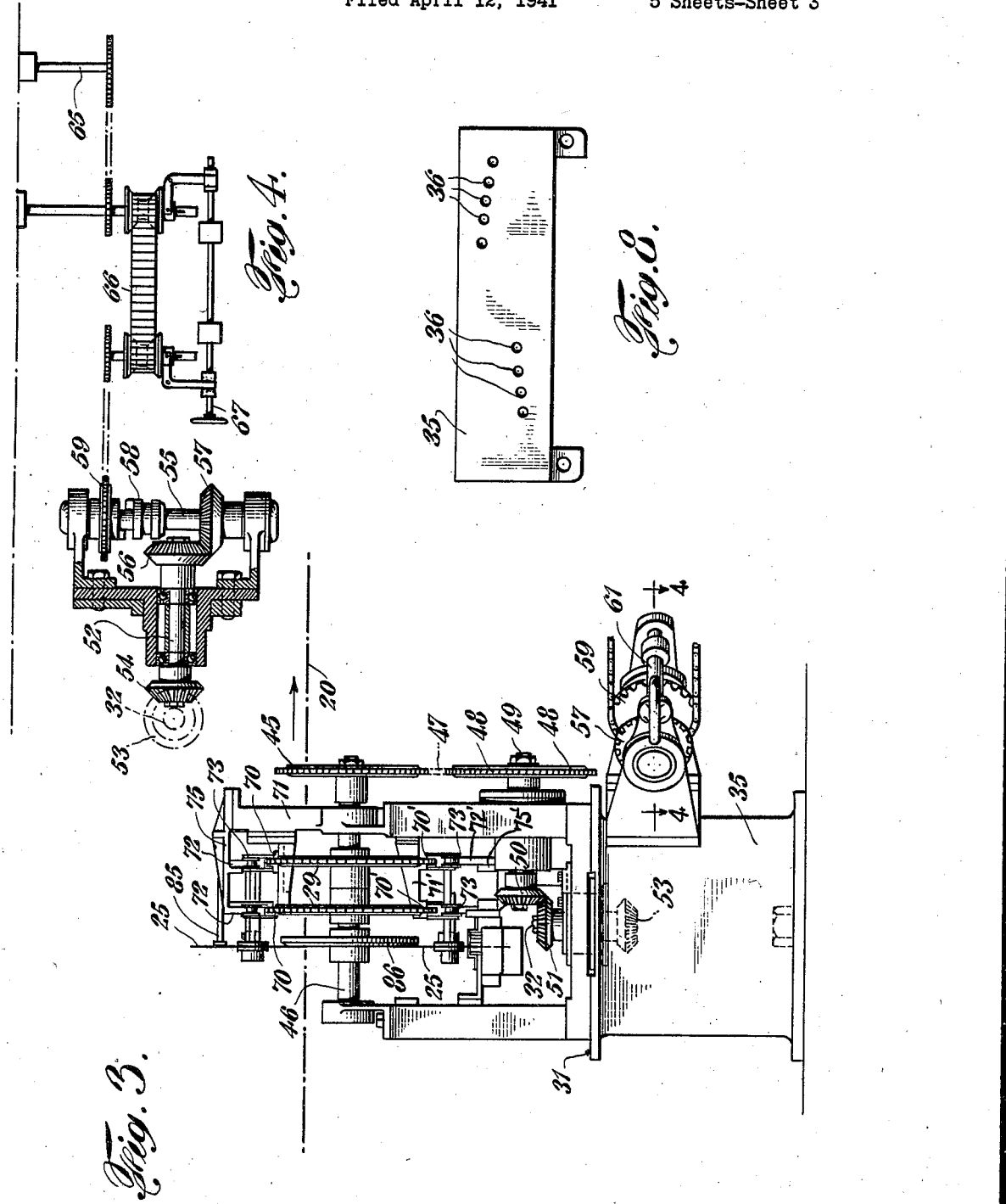

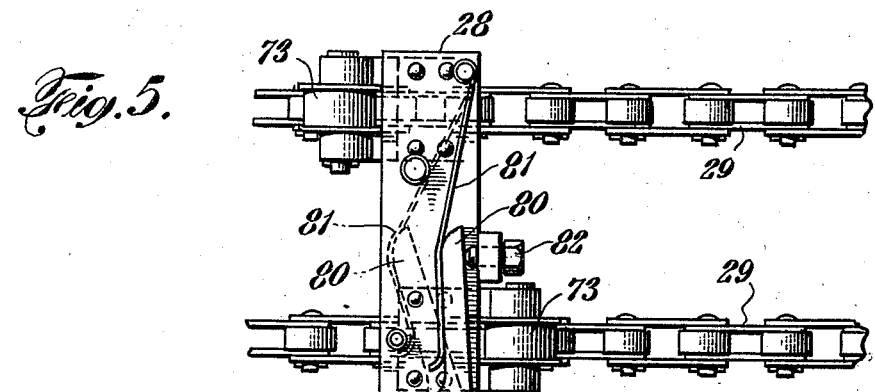
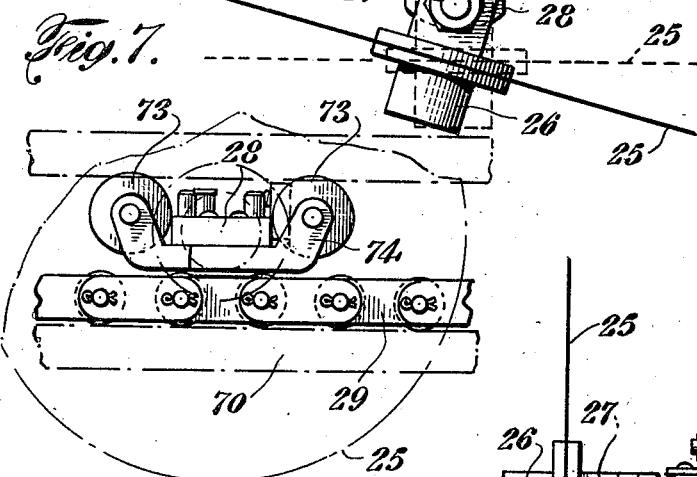
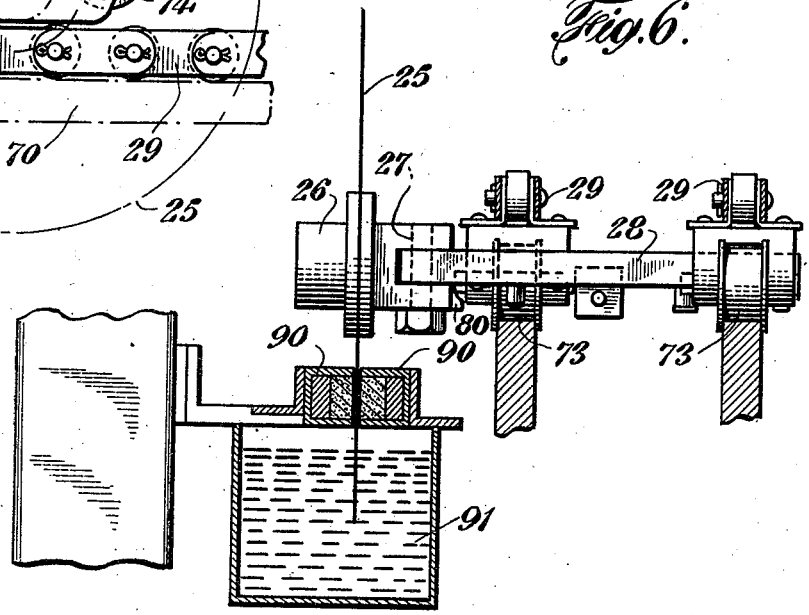

May 19, 1942. C. H. WILLIAMS 2,283,838
APPARATUS FOR CUTTING PASTRY STRIPS
Filed April 12, 1941 5 Sheets-Sheet 5
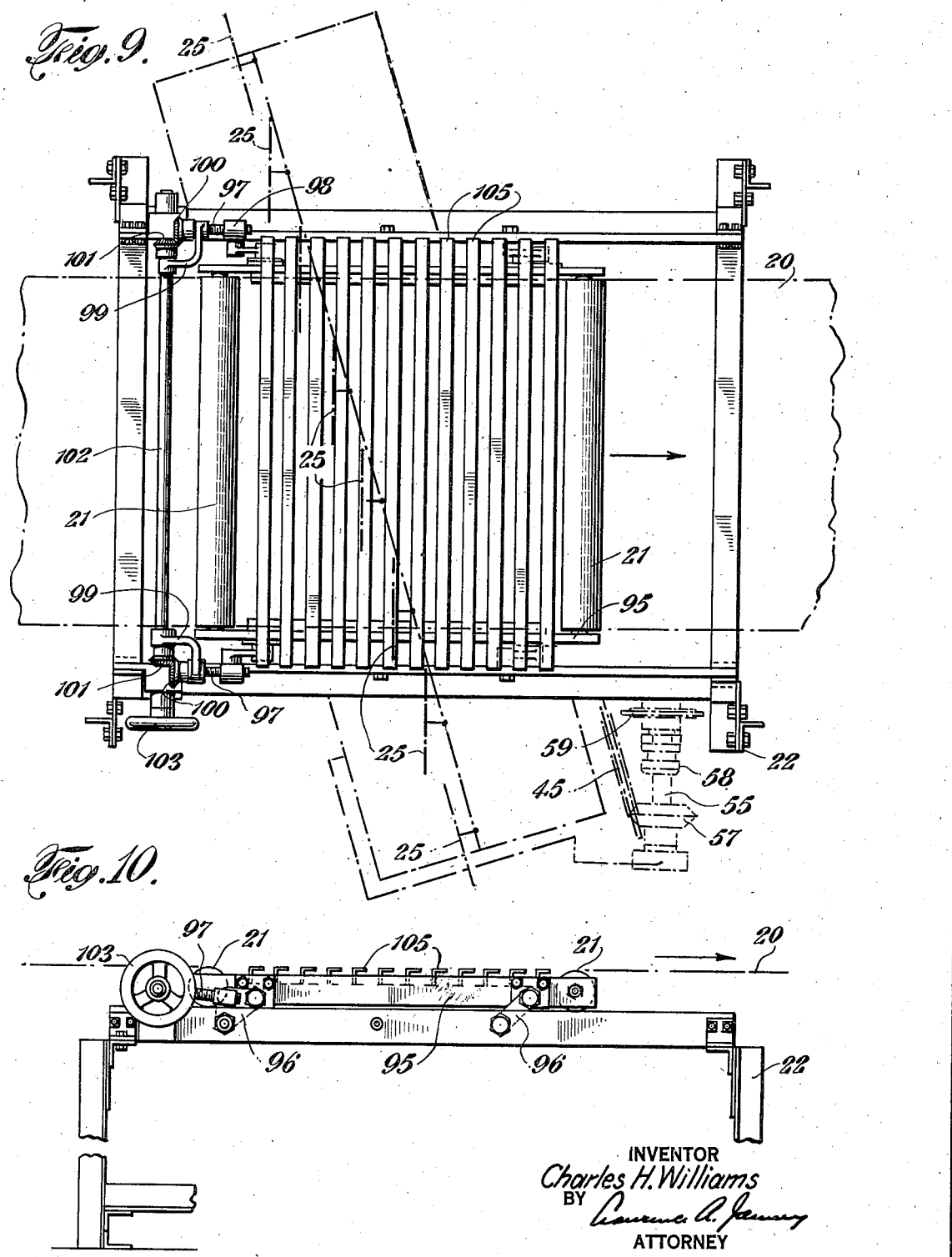
INVENTOR
Charles H. Williams
BY
ATTORNEY Patented May 19, 1942

2,283,838

UNITED STATES PATENT OFFICE 2,283,838

APPARATUS FOR CUTTING PASTRY STRIPS

Charles H. Williams, Indianapolis, Ind., assignor to William P. Morton, Indianapolis, Ind.

Application April 12, 1941, Serial No. 388,190

20 Claims. (Cl. 107—22)

This invention relates to apparatus for cutting pastry strips, and has for an object the provision of improvements in this art.

Certain bakery products such as fig bars are formed in continuous strips which are subsequently cut into lengths for packaging. For cutting such strips while advancing, there is one type of cutter which advances with the bar and then returns to starting position for another cutting trip. One type of cutter employs a plurality of parallel disks on a common shaft to cut a plurality of lengths from one strip for each cutting trip. As a result of making a number of cuts simultaneously, the cut pieces are often picked up between disks to spoil the action and the material. Particularly is this true when cutting fig bars because the material adheres to the disks. It is difficult to keep the cutters clean when cutting such material.

Another type of machine comprises transverse blades which advance on endless chains parallel to the advancing strips of material. Still other types are known.

The present invention provides an improved machine for cutting advancing strips whereby only one cut is made in a strip at one time and the pieces are not picked up by the cutting blades. The arrangement also provides that each cut is made by a clean cutting surface and that the cutters are thoroughly cleaned between cutting operations.

In the preferred embodiment of the invention a plurality of cutting disks in an endless series advance in echelon across the advancing strip or strips and then pass in coplanar alignment to a cleaning device, being shifted back into echelon arrangement before the next cutting passage. The disks are carried by an endless chain running at an angle across the line of advancement of the strips of material, the disk planes, however, being substantially normal to the line of advancement of the strips so as to move forward with them as the disks roll across them. The disks thus assume an angular position relative to the plane of their supporting chain during cutting, and shift into parallelism with the chain at other times. This angular position is adjustable and the angular position of the whole chain is adjustable as well as its speed, whereby the speed of the disks may be properly coordinated with the speed of the advancing strips. By this arrangement the lengths of the cut pieces may be kept uniform, or varied, if desired. Moreover, the entire cutting device or the strip conveyor may be moved out of cutting position relative to each other to permit strips to advance without being cut, when desired.

The preferred embodiment of the invention will be described in connection with the accompanying drawings thereof wherein:

Fig. 1 is a plan view of the cutting apparatus and a portion of the strip conveyor belt;

Fig. 2 is a front elevation taken transversely of the conveyor belt;

Fig. 3 is a right end elevation;

Fig. 4 is a horizontal section taken approximately on the line 4—4 of Fig. 3 to show the drive mechanism;

Fig. 5 is an enlarged partial plan view of a cutting disk and its supporting chains;

Fig. 6 is a cross-section through the chains and the disk cleaning mechanism, the view being taken on the line 6—6 of Fig. 2;

Fig. 7 is a fragmentary side view of parts shown in Fig. 5;

Fig. 8 is a plan view of the adjustable cutter head support, the view being taken approximately on the line 8—8 of Fig. 2;

Fig. 9 is a plan view of the conveyor table at the cutting device; and

Fig. 10 is a side elevation of Fig. 3.

The fig bar strips S move through and from an oven, which is not shown, upon a metal conveyor band or belt 20 carried upon suitable rollers 21 (Figs. 9 and 10) of a frame 22. At a distance from the oven where the strips are best adapted to be cut there is disposed the cutting apparatus which forms the subject of the present invention.

This cutting mechanism comprises a plurality of cutting disks 25 mounted on shafts 26 carried on pivots 27 of spaced frames 28 borne by a pair of endless chains 29. The chains are carried by sprockets 30 at each end of a cutter head frame 31 which extends across the conveyor belt 20. The head frame is swingably mounted to turn about the axis of a vertical drive shaft 32 at one side of the conveyor belt.

The head frame 31 is supported upon base pedestals 35 providing an arcuate support 36 (Fig. 8) for the outer end of the head frame. The plane of the disk-supporting chain stands at an angle to the center line of the conveyor belt and the line of the pastry strips thereon, as shown in Fig. 1, and this angle may be readily adjusted by swinging the head frame about the shaft 32 on the base frame. The swinging movement may be produced by any convenient means, as for example, a pinion and rack with a shaft extending back from the pinion to a hand wheel at a convenient control position near the pivoted end of the head frame. In Fig. 8 there are shown a series of holes in the pedestal for a locking pin.

The drive for the disk chain comprises a sprocket 45 on the shaft 46 which carries the chain sprocket 30 at the axis end of the swinging frame and a vertical sprocket chain 47 from the sprocket 45 to a sprocket 48 on a horizontal shaft 49 mounted in the swingable head frame. At its inner end the swingable shaft 49 is driven by the vertical shaft 32 through bevel gears 50 and 51. At its lower end the shaft 32 is driven from a fixed horizontal shaft 52 through bevel gears 53 and 54. Shaft 52 is driven from a clutch shaft 55 through bevel gears 56 and 57. The clutch collar 58 cooperates with the hub of a power drive sprocket 59 which, except when engaged, is free to rotate without driving the shaft 55. A shift rod 61 is provided for operating the clutch from the control position. The power sprocket and the cutting mechanism which it serves are driven in coordination with the conveyor belt and may be powered from one of the drive roller shafts 65 of the belt. A universal speed change device, such as a Reeves drive unit 66, may be introduced into the power line to permit adjustment in the drive speed relationship between the conveyor belt and the cutter disk chains. A speed shift rod 67 for the Reeves unit may be provided for convenient operation at the control position.

Suitable supports and guides are provided for the disk chains 29 in their travel along the upper span above the conveyor belt for cutting, and along their lower span below the conveyor belt for cleaning the disks. For the upper span the chains are carried on track guides 70 mounted on supports 71. Further guide and support is provided by tracks 72 along which run a plurality of double flanged grooved rollers 73 carried by brackets 74 secured to the chains. The tracks 72 are supported in spaced relation with reference to the track guides 70 by overhanging supports 75.

The disk shaft frames 28 are rigidly secured to the parallel chains 29 to cause them to move together as a unit and properly support the cutting disks to roll across the conveyor belt. The shafts of the disks are provided with an integral arm 80 which is swung by springs 81 against adjustable stops 82. The stops are adjusted in conformity with the angular position of the head frame to place the planes of the disks approximately normal to the center line of the conveyor belt when the arms 80 are permitted to be moved by the springs to swing the disks into cutting position. The stops may, of course, be adjusted to throw the disks slightly out of this position to shift the cut-off pieces away from the strip from which they are cut, if desired.

After the disks have passed across the conveyor, they engage a fixed member 85 which swings them into co-planar alignment parallel to the chain. They are held in this position as they pass around the sprocket shaft 46 by a plate 86 secured to the shaft. The edge of the plate is beveled to assist the disks into and out of engagement without injury. A similar plate 86 is secured on the sprocket shaft at the other end of the head frame. The engaging end of the member 85 and the face of the plates 86 may be covered by a soft material such as leather to prevent injury to the disks.

The means provided for cleaning the disks comprises a guiding wiper 90 and a washing pan 91 therebelow. As the disks come down in alignment with each other from the plate 86, they enter the narrow space between the wiper rails and are held in alignment and forced to rotate by frictional engagement below their axes. The rotation causes all parts of their cutting peripheries to pass through the fluid in the pan 91 and to be rubbed by the wiper.

As the disks leave the wiper, they engage the other plate 86 which holds them in alignment until they pass around and above the sprocket shaft at that end. When they are released from the plate they are shifted into proper cutting position by the springs of their mounting frames.

Adjacent the wiper the chains 29 are guided along upper tracks 70' and the grooved rolls 73 are supported and guided along tracks 72'. The tracks 70' are carried by brackets 71' and the tracks 72' by supports 75'.

The circumference of the disks is as long as the distance across the conveyor belt on which strips are disposed for cutting, and may be longer. This insures that no part of a disk will cut twice on one trip across the conveyor belt and that each pastry strip will be cut by a clean edge of the disks.

The means for bringing the conveyor belt and the disks together for cutting pastry strips and separating them when it is desired to move strips past the cutter without cutting them is shown in Figs. 9 and 10. Here the frame 22 carries a table 95 upon parallel arms 96 which are pivoted to the frame and the table. At opposite sides, screw shafts 97 are threaded in members 98 secured to the table and are journaled in pivoted brackets 99. The screw shafts are provided with bevel gears 100 which mesh with bevel gears 101 fast on a transverse shaft 102. The shaft 102 is turned by a hand wheel 103 to raise and lower the table.

The conveyor supporting surface of the table is formed of parallel slats 105. The rolls 21 guide the conveyor belt on and off the table. These rolls are not driven as are some of the rolls which support the conveyor.

In operation, the conveyor 20 moves in the direction of the arrow in Fig. 1, carrying upon it a number of parallel strips S. If these strips are fig bars, they have already been baked and cooled to a certain extent, according to the preferred procedure. Of course a single strip or sheet the full width of the conveyor may be cut as well as a plurality of strips. The disk-carrying chains 29 travel in the direction of the arrow alongside.

It will be assumed that the disks 25 carried by the chains are to cut along a line perpendicular to the length of the conveyor. The cutting head 31 and the chains 29 are disposed at an acute angle to the length of the conveyor (considered in respect to mutual convergence on the incoming side), hence the disks 25 must be inclined at an angle to the chains in order to be perpendicular to the conveyor. At this time the disk levers 80 are free to be moved by their springs 81 until they engage their adjustable stops 82 to place the disks in the desired position.

The disks cut across the conveyor as they move down with it, hence their only movement relative to the conveyor is a transverse rolling movement along a line perpendicular to the conveyor. The speed of the disk chain will correspond to the cosine of the acute angle between belt and conveyor, and the speed of the conveyor will correspond to the sine of this angle. As shown, the disk chain speed is considerably greater than the conveyor speed. This may be varied by the speed change mechanism provided. The angle may also be correspondingly changed by swinging the cutter head and securing it in the new position.

If the head is swung to a new position without changing the relative speeds, the disks will move along a transverse line other than a perpendicular, and this may be desired in some cases.

The disk lever stops 82 will be adjusted correspondingly for any change in speed or angularity to cause the disks to run true along a transverse line—perpendicular or otherwise—or to run askew to their line of travel, if desired to push the pieces away from the strips when cut.

The disks, being disposed in echelon, will cut in series across the conveyor. There will be no strip which is cut at one time by two disks, hence the strips will not wedge between the disks and be picked up. Neither will the disks pick up pieces on account of residual sticky material because the disks are cleaned and wiped after each cutting trip and they are sufficiently large to take only one cut at any part of their circumference on any cutting trip.

After a disk has moved across the conveyor, the turning member 85 strikes it just beyond the shaft axis to swing it parallel to its chain. Immediately thereafter it engages the plate 86 which holds it in this position. When it moves down around the shaft 46 it enters the slot between the wiper rails 90 and is held in alignment until it reaches the other plate 86. This holds it in alignment until it passes up over the shaft at this end, whereupon the disk is released and again assumes its cutting position.

By varying the angle and speed of the belt, the length of pieces cut from the strip may be varied.

The operation of the cleaning mechanism, the speed-change mechanism and the cutter head orienting mechanism will be clear from the description of these mechanisms. The operation of the table adjusting mechanism will also be clear; but it may be explained that the table may be raised gradually and evenly to make fine adjustments between the conveyor and disks. The disks may be made to press against the conveyor with any desired pressure or may be disposed at any desired distance above the conveyor, the limit being at the height where the strips on the conveyor clear the disks in passing. At such times, the disks do not cut the strips and may be put out of operation by the clutch 58.

It will thus be seen that the invention provides a cutting device which operates in a very effective manner for cutting strips and is particularly suited for cutting sticky or gummy strips, such as fig bars. Some moisture from the cleaning operation may remain on the disks and this will assist in their cutting action, particularly in elimination sticking. The device is relatively simple and inexpensive and is easily adjusted or repaired.

While one embodiment of the invention has been described to illustrate the principles of the invention, it is to be understood that the invention may have various embodiments within the limits of the prior art and the scope of the subjoined claims.

I claim as my invention:

1. Apparatus for cutting pastry strips and the like, comprising in combination, a conveyor for carrying a longitudinally advancing strip, an endless transverse belt having a cutting span above the conveyor and a cleaning span below the conveyor, a plurality of rotatable cutting disks pivoted at spaced intervals to said belt, said disks being disposed in echelon in parallel planes disposed at an angle to the belt in the cutting span and being disposed in alignment parallel to the belt in the cleaning span, and wiper rails forming a slot between them to bind the aligned disks and cause them to rotate for cleaning.

2. Apparatus as set forth in claim 1 which further includes a pan beneath the wiper rails for cleaning liquid.

3. Apparatus for cutting pastry strips and the like, comprising in combination, a conveyor for carrying a longitudinally advancing strip, a cutting disk movable across said conveyor to cut the strip, and means for cleaning said disk between cutting passages, said cleaning means comprising wiper rails for rotating and wiping the disk as it travels in the slot between them, and a pan of cleaning liquid beneath the wiper rails in which said disk runs.

4. Apparatus for cutting pastry strips and the like, comprising in combination, a conveyor for carrying a longitudinally advancing strip, a cutting disk movable across said conveyor and having a circumference at least as long as the cutting zone across the conveyor whereby no more than one cut is made by any part of the blade at one passage, and means for cleaning the blade between passages across the conveyor.

5. Apparatus for cutting pastry strips and the like, comprising in combination, a conveyor for carrying a longitudinally advancing strip, a belt disposed transversely of said conveyor in a cutting span and a return span, a succession of cutting blades carried by said belt, means for positioning said blades at an angle to the belt along the cutting span, means for positioning said blades in alignment parallel to said belt on the return span, and means for cleaning the blades while in alignment.

6. Apparatus for cutting pastry strips and the like, comprising in combination, a conveyor for carrying a longitudinally advancing strip, a belt carrying cutting disks in an endless path in two spans transversely of said conveyor, one for cutting the strip and one for cleaning the disks, and means for cleaning the disks on the second span.

7. Apparatus for cutting pastry strips and the like, comprising in combination, a conveyor belt for carrying a longitudinally advancing strip, a cutter head disposed transversely of said conveyor belt, a cutter belt carried on spaced shafts on said cutter head, said cutter belt passing over and under said conveyor belt, a plurality of rotatable cutter disks pivotally mounted at spaced intervals on said cutter belt, means between said disks and said belt for moving and holding said disks in a fixed angular position relative to said cutter belt, means near one of said shafts for moving said disks parallel to said cutter belt, plates on said shafts for holding said disks parallel to said cutter belt, and means beneath said conveyor belt for holding said disks parallel to said cutter belt as they travel between said shafts.

8. Apparatus for cutting pastry strips and the like, comprising in combination, a conveyor belt for carrying a longitudinally advancing strip, a cutter head disposed transversely of said conveyor belt, a cutter belt carried on spaced shafts on said cutter head, a plurality of cutting disks carried by said cutter belt, pivot mounting means for said disks on said cutter belt, means on said cutter belt tending to position said disks at an angle to the cutter chain, means near one of said shafts for moving said disks parallel to said cutter belt, and means on said shafts for holding the disks parallel to the cutter belt as they pass around the shafts.

9. Apparatus for cutting pastry strips and the like, comprising in combination, a conveyor belt for carrying a longitudinally advancing strip, a cutter belt disposed transversely of said conveyor belt, a plurality of cutting disks carried by said cutter belt in endless succession in echelon across the path of the strip, a lever for each disk pivoted to said cutter belt, resilient means and a stop on said cutter belt acting upon an arm of said lever for moving said disks into echelon, and means beyond the cutting zone for moving said disks successively into alignment.

10. Apparatus as set forth in claim 9 in which said last-mentioned means comprises a fixed member which engages and turns the disks as they pass.

11. Apparatus for cutting pastry strips and the like, comprising in combination, a conveyor for carrying a longitudinally advancing strip, a belt disposed transversely of said conveyor, a plurality of cutting blades carried by said belt in endless succession in echelon across the path of the strip, means for moving said blades into alignment parallel to said belt when they move out of the cutting zone, and means for moving said blades out of alignment and into echelon when they approach the cutting zone.

12. Apparatus for cutting pastry strips and the like, comprising in combination, a conveyor for carrying a longitudinally advancing strip, a belt, a plurality of cutting blades carried by said belt in echelon across the path of the strip, and means for moving said blades into alignment when out of the cutting zone.

13. Apparatus for cutting pastry strips and the like, comprising in combination, a conveyor for carrying a longitudinally advancing strip, and a plurality of cutting blades movable in echelon across the path of the strip.

14. Apparatus for cutting pastry strips and the like, comprising in combination, a conveyor for carrying a longitudinally advancing strip, a cutting blade movable across the path of the strip while advancing with it, an endless belt for traversing said blade across said strip, the blade standing at an angle relative to the length of said belt while moving across the strip.

15. Apparatus for cutting pastry strips and the like, comprising in combination, a conveyor for carrying a longitudinally advancing strip, a cutting blade movable across the path of the strip while advancing with it, an endless belt for traversing said blade across the strip, said blade standing at an angle relative to the length of said belt while moving across the strip and standing parallel with the belt when not moving across the strip.

16. Apparatus for cutting pastry strips and the like, comprising in combination, a conveyor for carrying a longitudinally advancing strip, a cutting blade movable across the path of the strip while advancing with it, an endless belt for traversing said blade at different levels and in different directions transversely across the path of the strip, at one level to cut the strip, and mounting means for said belt at a fixed position along said conveyor, whereby the absolute path of said blade relative to said belt coincides with its resultant path relative to the strip, and reciprocation of the belt relative to the conveyor is avoided.

17. Apparatus for cutting pastry strips and the like, comprising in combination, a conveyor for carrying a longitudinally advancing strip, a cutting blade movable across the strip while advancing with it, and means for traversing said blade across the strip, said blade traversing means being aligned with the resultant of the components of movement of the blade relative to the strip so as to have movement parallel to the movement of the blade while occupying a fixed position along the strip conveyor.

18. Apparatus for cutting pastry strips and the like, comprising in combination, a conveyor for carrying a longitudinally advancing strip, a transverse cutter head, means on said head for advancing cutter blades across said conveyor, and mounting means for said head at one side of the conveyor providing swinging movement of the head along the length of the conveyor to vary the angle therebetween.

19. Apparatus for cutting pastry strips and the like, comprising in combination, a conveyor for carrying a longitudinally advancing strip, a transverse cutter head, means on said head for advancing cutter blades across said conveyor, mounting means for said head at one side of the conveyor providing swinging movement of the head along the length of the conveyor to vary the angle therebetween, and means for varying the speed of said blade advancing means relative to the speed of the strip.

20. Apparatus for cutting fig bars and the like, comprising in combination, a flat supporting table, means for adjusting the height of said table, a conveyor band movable over said table for advancing a plurality of strips to be cut, a cutter head disposed transversely of said table and conveyor band, a mounting for said head providing pivotal movement therefor about a vertical axis at one side of the table and conveyor, spaced cutter chains supported on sprockets on shafts at the opposite ends of the cutter head for movement above and under said band, spaced disk mounting frames secured to said chains, rotatable cutter disks mounted on levers pivoted to turn about vertical axes on said frames, springs on said frames for moving said disks into echelon in parallel planes disposed at an angle to the vertical planes of said chains, adjustable stops for limiting the movement of said disks, guides for closely confining said chains laterally and vertically as they move across the conveyor band for cutting, a fixed member near the pivoted end of the cutter head adapted to engage said disks in succession and turn them into alignment when they pass beyond the cutting zone on said conveyor band, plates mounted on said shafts for holding said disks in alignment while passing around the shafts, spaced cleaning rails forming a narrow long slot between them to receive the aligned disks and hold them in alignment between said plates and also to cause them to rotate, a pan for liquid below said rails, guide and supporting means for said chains above said rails, means for adjusting the angular position of said head about its axis, means for driving said shafts and chains through said vertical head axis, means for connecting said drive means to operate the cutting means when the table is raised to bring the strips in the path of said disks and to disconnect it when the table is lowered, and means for varying the speed of said cutter drive in relation to the conveyor band speed.

CHARLES H. WILLIAMS.